United States Patent [19]
Wilson et al.

[11] Patent Number: 5,048,463
[45] Date of Patent: Sep. 17, 1991

[54] CONTROL SYSTEM FOR ACCESSORIES USED WITH SMALL ANIMALS AND PETS

[75] Inventors: C. Carl Wilson, 2807 Illinois La., Manhattan, Kans. 66502; Kevin D. Dutton, Morton, Ill.

[73] Assignee: C. Carl Wilson, Manhattan, Kans.

[21] Appl. No.: 598,468

[22] Filed: Oct. 15, 1990

Related U.S. Application Data

[63] Continuation-in-part of Ser. No. 368,576, Jun. 20, 1989, abandoned.

[51] Int. Cl.$^5$ ............................................. A01K 1/00
[52] U.S. Cl. ................................. 119/163; 119/51.14
[58] Field of Search .................... 119/1, 51.02, 51.14, 119/55, 163, 164

[56] References Cited

U.S. PATENT DOCUMENTS

| | | | |
|---|---|---|---|
| 3,132,350 | 5/1964 | Carlson . | |
| 3,227,138 | 1/1966 | Campbell | 119/1 |
| 3,318,285 | 5/1967 | Betham | 119/1 |
| 3,557,757 | 1/1971 | Brooks | 119/51.02 |
| 3,734,057 | 5/1973 | Lee et al. | 119/159 |
| 3,811,410 | 5/1974 | Roberts | 119/1 |
| 3,835,812 | 9/1974 | Edward | 119/1 |
| 3,842,803 | 10/1974 | Temel | 119/1 |
| 4,036,178 | 7/1977 | Lee et al. | 119/51.02 |
| 4,188,912 | 2/1980 | Smalley | 119/51.02 |
| 4,196,693 | 4/1980 | Unversaw | 119/164 |
| 4,228,554 | 10/1980 | Tumminaro | 119/1 |
| 4,231,321 | 11/1980 | Cohen | 119/1 |
| 4,463,353 | 7/1984 | Kuzara | 119/51.02 |
| 4,660,506 | 4/1987 | Nalven | 119/1 |
| 4,733,634 | 3/1988 | Hooser | 119/55 |

OTHER PUBLICATIONS

Sloan Catalog 850–S, Copyright 1983, pp. 1–11, Section 15, "Flushometer".
J. P. Shields, Proximity Detectors and Metal Locators, 2nd Ed., Chapters 1 and 4, Howard W. Sams & Co., Indianapolis, 1972.
Heathkit Catalog, Winter 1991, vol. 223, pp. 6–7, of Home Automation Section on "Motion Sensors".

Primary Examiner—Paul J. Hirsch
Attorney, Agent, or Firm—John O. Mingle

[57] ABSTRACT

A control system for accessories used with small animals and pets comprises an accessory module, such as a pet flush toilet, small animals feeder, or small animals trainer, coupled with a detector systems that senses the presence of said small animal or pet at the needed location and transmits appropriate signals to a logic control segment designed for the particular accessory module employed. Such detectors do not physically restrict small animals or pets and can be passive infrared or proximity in their principles of operation. The preferred embodiment is demonstrated by controlling an accessory module comprising a pet flush toilet system with a delay-reset logic control.

11 Claims, 2 Drawing Sheets

CONTROL SYSTEM FOR ACCESSORIES USED WITH SMALL ANIMALS AND PETS

This invention represents a continuation-in-part of Ser. No. 07/368,576, filed June 20, 1989, entitled Pet Flush Toilet, and said prior application is expressly abandoned.

BACKGROUND OF THE INVENTION

1. Field of the Invention

This invention relates to the field of control systems for accessories used with small animals and pets, and more specifically to that of a control system for a pet flush toilet.

2. Background

Pets indoors and small animals in research laboratories, clinics, catteries, or similar facilities, have always needed facilities to service their needs. For instance, toilets to contain their excretions in order to insure a reasonable sanitary situation for the health of not only surrounding persons but the pet itself. Another aspect is special feeders and training modules so that such animals can receive their necessary food, medicine or other needed materials.

Depending upon the size and type of animal, such as cats, dogs, rabbits, guinea pigs, or household pets, pet toilets varied from primitive methods of catching and removing droppings from the bottoms of cages to litter boxes that are emptied and cleaned when demand dictates. For instance, on the average several hundred pounds of litter are used per year for a household pet, and this represents an ecological impact on our society's resources. In more modern times pet toilets have evolved that utilize control systems for automatic, or at least semi-automatic, disposal of such excretions. Many utilize some flushing mechanism and have been developed to provide better health and sanitation by reducing odors and not requiring manual handling of the excretion-collecting filler or container. Some utilize purely mechanical means of flushing while others involve controls requiring an electrical power source.

An overall view shows that a system designed to operate successfully an automatically flushing pet toilet is essentially the same as one needed to selectively dispense needed food, medicine and other materials to small animals, including pets, since the key control component represents the sensing of the animals presence. Thus, prior art U.S. patents covering the above mentioned concepts are concentrated in the pet toilet field and include:

| U.S. Pat. No. | Inventor | Year |
| --- | --- | --- |
| 2,204,416 | Kramer | 1940 |
| 3,132,350 | Carlson | 1964 |
| 3,227,138 | Campbell | 1966 |
| 3,318,285 | Betham | 1967 |
| 3,734,057 | Lee et al. | 1973 |
| 3,747,563 | Brockhouse | 1973 |
| 3,811,410 | Roberts | 1974 |
| 3,835,812 | Edwards | 1974 |
| 3,842,803 | Temel | 1974 |
| 4,050,414 | Knochel et al. | 1977 |
| 4,117,555 | Dennis | 1978 |
| 4,181,096 | Grubman | 1980 |
| 4,196,693 | Unversaw | 1980 |
| 4,228,554 | Tumminaro | 1980 |
| 4,231,321 | Cohen | 1980 |
| 4,660,506 | Nalven | 1987 |
| 4,729,342 | Loctin | 1988 |
| 4,748,700 | Wooten | 1988 |

The background art germane relates to controls for automatic flushing systems. However, substantially mechanical or hydraulic systems give only interesting background information, but do not include the total needed flexibility of the current invention. Such background includes, from the above list, Kramer, Carlson, Betham, Brockhouse, Edwards, Temel, Knochel et al., Dennis, Grubman, Tumminaro, and Nalven.

The other listed inventions potentially represent germane prior art. Campbell discloses a movable floor switch triggered by the animal's weight that directly controls a valve for a timed-release of pressurized floor-level flush. Lee et al discloses a controlled timed flush by using a photocell trigger with potential delay to determine when the pet enters and leave the chamber. Roberts also uses a photocell detector, with potential delay, directed over the toilet so that beam interruption and then re-detection means that the pet has come and gone from said toilet and the flushing cycle can commence. Unversaw discloses an activated floor switch flush that cleans a motor-driven belt conveyor used for transporting the excreted animal material; further a timed delay is built-in before flush as well as a reset initiated if the floor switch is closed during the delay timing. Cohen discloses a photocell device to ascertain whether a pet is present on a commode accessory before a motor-operated flush occurs. Loctin discloses a high walled chamber pet toilet with an active infrared photocell across it that controls said chamber door that when closed after the pet leaves delays a flush cycle; further, different timed periods of beam interruption are used to determine when said toilet has been actually used. Wooten discloses a portable commode accessory chamber using a floor switch and preselected timing of sanitary rinse and commode flush.

In contrast to the above, the subject invention concentrates on animal comfort or training by employing special control features that complement the pet'normal activities and do not restrict its movement. That is, in no way is the pet disturbed by the control system.

SUMMARY OF INVENTION

A control system for accessories used with small animals and pets comprises an accessory module coupled with a detector system that senses the presence of said small animal or pet at the needed location and transmits appropriate signals to a logic control segment designed for the particular accessory module employed. The accessory module can be a pet flush toilet, a small animals feeder, a small animals trainer, or other such situations requiring positive knowledge of the presence of small animals or pets. Such detectors do not physically restrict small animals or pets and can be passive infrared or proximity in their principles of operation. The preferred embodiment is demonstrated by controlling an accessory module comprising a pet flush toilet system.

DRAWINGS

DETAILED DESCRIPTION

The preferred embodiment for the flush control system for pet toilets is designed for cat use; thus, any sizes indicated or inferred are for use with reasonable sized cats, but other sizing of the invention for larger animals, such as dogs, is potentially straight-forward.

The subject invention is a control system to be used with small animal or pet accessory modules. The important aspect is that the presence of the pet at a particular location is sensed so that requirements for said pet can then be performed by the logic control system. Another important aspect is that said pet can approach the given location from any direction, that is, entrance through a given door of other entryway is not necessary; thus, no constraint on the normal activity of the small animal or pet is required.

In order to show the embodiment of the subject invention, a pet flush toilet has been selected an example of an accessory module, where the one important desired action is that the flush system not trigger while the pet is on the toilet surface.

Figure 1:
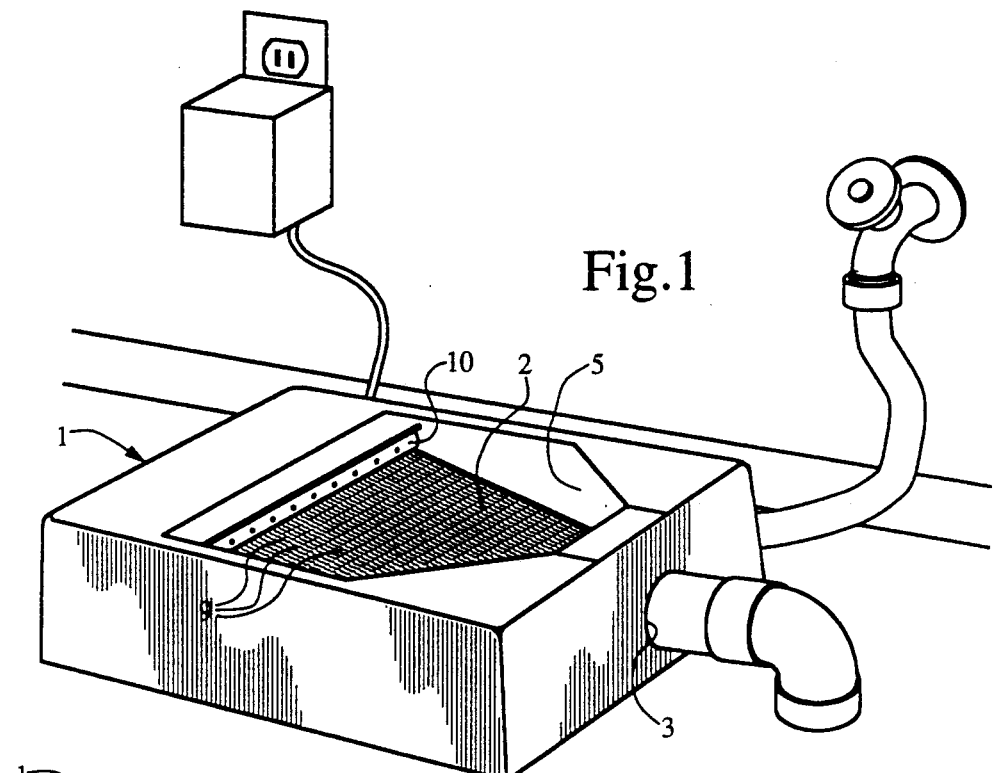
FIG. 1 shows a convenient embodiment of a pet flush toilet with flush flow streamlines in a low-wall sloping cavity that allows easy access by the pet from any direction.
Figure 2:
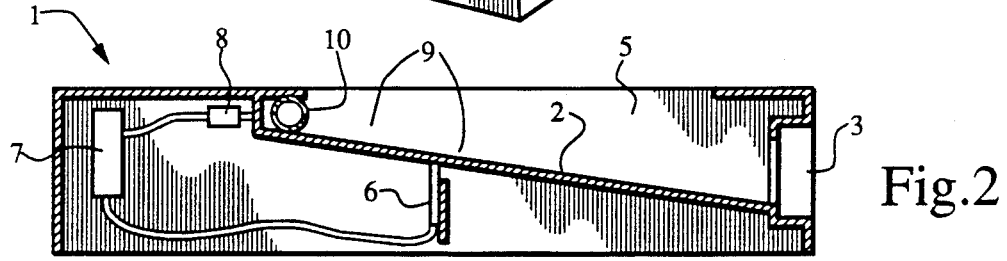
FIG. 2 shows a section along A—A as indicated in FIG. 1 indicating potential location of control elements.
Figure 3:
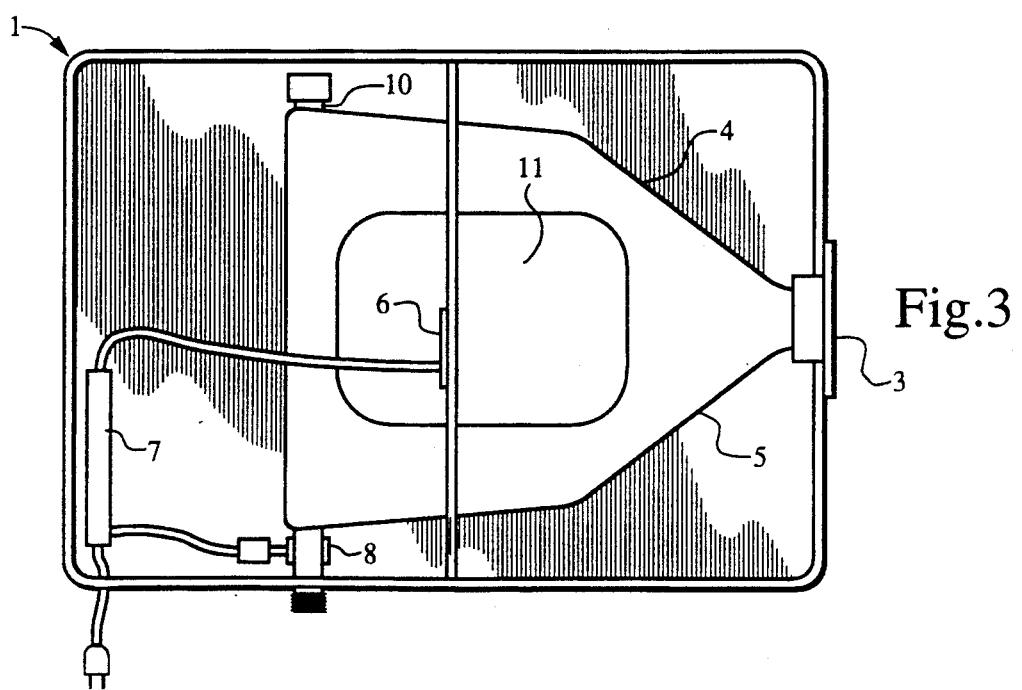
FIG. 3 shows a bottom view where the cavity floor shape is apparent and indicates the general sensor locations.

Referring to FIGS. 1, 2, and 3, the chamber 1 for the pet flush toilet is composed of a molded material, such as plastic. It is shaped to contain the necessary elements of the invention which are often mounted under the top surface away from view. The top chamber surface forms a cavity with floor 2 where the pet excretes that is slightly sloping toward a drain hole 3. The actual slope of the cavity floor 2 for any particular case is a function of the cavity size and shape and the amount and timing of the flush 9 from the liquid flush tube 10 when the electrically operated flush value 8 opens. The criteria is to have sufficient slope to now overflow the sides 4 and 5, drain all material, including the excretions, adequately into the drain hole 3, and fully flush clean the total floor 2. The sequence of holes in the flush tube 10 will be determined so as to flush the floor adequately for a given flush pressure, such as household tap water pressure, and length and size of tube 10. Generally the holes are irregularly spaced for fluid entrance on one end of the tube, and a few trials of several hole spacings will determine an adequate flush 9 contour for the floor based upon the excretion of the small animal or pet and the length of the flush cycle by the control system 7.

The floor 2 has imbedded in it the sensor 11 for the control system. Depending upon what type of system is selected, determines what type of the sensor element is employed. Passive infrared and proximity, non-directional detectors are recommended. Each type of sensor will be accompanied by a detector interface circuit that properly interprets the signals from the detector. The sensors are independent of the actions of the small animal or pet, for they just depend upon its presence and not what it is doing.

Infrared detection systems can be classified as active and passive. An infrared photocell beam that is disturbed is considered an active detector. Conversely, passive infrared detectors depend upon sensing infrared spectrum rays either coming from a heated source or of a reflected nature. The subject invention uses only a passive infrared detector.

Such a passive infrared detector is both a heat-sensing and motion-sensing device and is usually referred to as dual element pyroelectric sensor. It can be imbedded in a flat or even manner on a surface, such as the cavity floor or wall for such mounting will not thermally or physically insulate it from said pet and the response will be rapid. Such dual element pyroelectric sensors detect both the body heat and the motion of the small animal or pet and can be made from lead sulfide, mercury cadmium telluride, or other crystals having the required infrared spectrum sensitivity. The motion detection is by reflected infrared rays using a photocell crystal sensitive to the reflected spectrum. A common application of such systems is for yard security.

The interface circuit for this passive infrared detector, besides containing calibration means, will basically involve bridge circuits with appropriate stages of amplification in order to measure and interpret the small change in electrical properties occurring within said detector. W. L. Wolfe and G. J. Zissis's *The Infrared Handbook* is a good source for more information.

If a proximity detector is imbedded in the floor, it can be place below the floor, since its principal of operation is based upon electrical capacitance, and any such capacitance of the floor can be accounted for by calibration. Further, calibration can partially compensate for the size of said small animal or pet; however, a larger detector may be necessary to obtain the sensitivity necessary. For proximity detectors a loop of wire may be sufficient; another potential detector is a flat plate of metal. Either of these can be easily placed below the floor. The interface circuit for this proximity detector will basically involve a capacitance measuring circuit with appropriate stages of amplification in order to measure and interpret the small capacitance change of said detector. Common metal detectors work on this same basic proximity principal. J. P. Shields' *Proximity Detectors and Metal Detectors*, 2nd Edition, is a good source of additional information.

A small animal or pet presence on the cavity is sensed in some manner by the detector 11 imbedded in the floor 2. An important aspect of this control system for a pet flush toilet is that the flush not start in the presence of said pet. Therefore, the control system 7 absolutely keeps the electrically operated valve 8 from being energized and opened. Only after the pet has been away for a sufficient time, will the flush system operate. If the pet returns for any reason, a reset designed into the control logic segment for this module keeps the flush from occurring.

Figure 4:
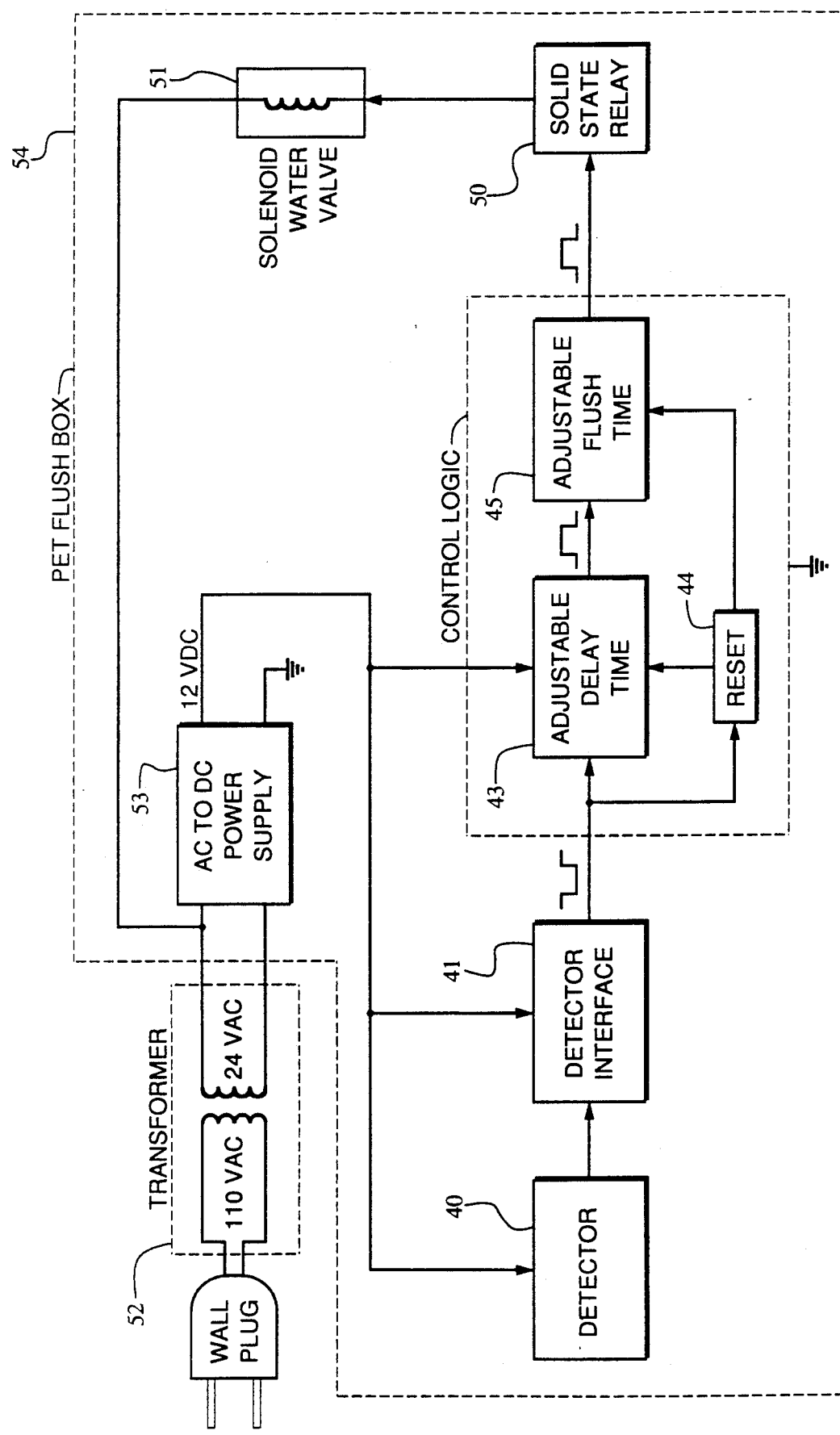
FIG. 4 shows a general block diagram of the control system.

FIG. 4 shows the controller in block diagram form. The detector 40, or 11 in the previous figures, detects the presence of the small animal or pet. The detector interface circuit 41, or 6 in the previous Figures interprets said signal depending upon the type of detector, whether passive infrared, proximity, or microswitches, and contains calibration means, such as variable resistors, that can be set for given sizes of small animals or pets. This detector interface circuit passes information on to the control logic segment 42, which is a circuit board or integrated circuit that matches the requirements of the particular accessory module. In this instant case the pet flush toilet requires two adjustable timing circuits: one for delay before starting flush after the pet leaves the toilet 43, usually from 15 seconds to a few minutes is adequate, and the other for timing the length of the flush cycle 44, which may be from a few seconds to a few minutes and which must take into account the particular flush design that was adopted and the characteristics of the small animal or pet. A few trials usually produces satisfactory results. The other important circuit is the reset 44 which resets the adjustable delay time 43 back to null if a signal from the detector 40 through the detector interface 41 is received while said adjustable delay time 43 is energized. The reset 44 will additionally stop the flush cycle if started by the adjustable flush timer 45.

External to the control logic segment 42 are routine components, such as the solid state relay 50 and solenoid flush valve 51, or 8 in the previous figures. The power supply is commonly 24 volt ac supplied by a transformer 52 from household current; this then feeds a dc power supply 53 producing sufficient voltage, such as 12 vdc, and current to adequately operate the sensors and the necessary circuits and relays. With modern solid state components and integrated circuits the actual physical dimensions of the total control package 54 installed in the pet flush toilet can be insignificantly small, such as pencil sized. It is common to place the transformer 52 at the outlet wall plug to lower the potential for any electrical shocks from the pet flush toilet to persons or animals.

This ability to have a flush delay time triggered by the pet leaving the toilet with reset provisions enhances the mental health and eases the training necessary for the pet. In order to protect against misuse of the pet flush toilet, the preferred embodiment employs an optional screen-type barrier over the drain hole 3. However, this screen must contain large apertures so that all excretions can wash through easily and not build up on the barrier; yet, the barrier should stop something unwanted, such as a kitten, from washing into the drain.

The drain hole 3 will allow the flush liquid to leave the cavity; however, normally it is directed into a floor drain as shown in FIG. 1 or plumbed into an existing sewer system. However, since the pet flush toilet can be easily moved, it could be set in a bathtub, shower, bathroom toilet, kitchen sink, or other appropriate place for use by a pet.

The embodiment of the subject invention as disclosed above has been directed at a pet flush toilet. However, many more uses are available for such a control system for small animals and pets in laboratory, clinic or other situations.

Many feed type situations could be designed with an accessory module so that the particular food would not be delivered by a feeder mechanism unless the subject animal was present. The sensor mounted in the floor, or perhaps on the wall over, under or adjacent to the feeder would sense the presence of the animal and start a feed mechanism either for a given time or a given amount of food. Selective calibration and tuning of this control system would allow the detection of different animals, if they were different sized. For instance, a dog and cat feeder could be arranged with an appropriate control system to feed the dog when it was present and the cat was it was present, since the large difference in size between the two animals would produce distinctively different magnitude of signals for the passive infrared and proximity detectors.

A training arrangement could be utilized as an additional accessory module. A clock timer would feed the animal, if detected by the control system, between certain time periods. If the animal was not present sufficiently close to the feeder to be detected, no food would be dispensed. If the animal was present, and it was the appropriate time then food would be dispensed. The animal would likely soon learn to be present at feeding time, and in addition, only expect to be fed at distinct times. Further, this would allow remote feeding at times when support personnel were unavailable, such as in the middle of the night or while away at work.

Other accessory modules involving service to small animals or pets or condiments, medicine, or other products or activities are readily apparent which involve situations where a sequence of events is necessary or where it is not desirable to leave materials exposed for extended periods.

While in the foregoing we have disclosed an embodiment of the invention in considerable detail for purposes of illustration, it will be understood by those skilled in the art that many of these details may be varied without departing from the spirit and scope of the invention.

All references referred to in the foregoing specification are hereby fully incorporated by reference in this application.

We claim:

1. A control system for accessories used with small animals or pets comprising;
    an accessory module with logic control and reset segment;
    non-directional passive infrared detectors with accompanying interface circuits to verify the presence of said small animals or pets, said detectors mounted on structural elements associated with said accessory module; and
    appropriate electrical connectors for said control system.

2. The control system according to claim 1 wherein said accessory module further comprises a small animals feeder.

3. The control system according to claim 1 wherein said accessory module further comprises a small animals training system.

4. The control system according to claim 1 wherein said accessory module further comprises a pet flush toilet.

5. A control system for accessories used with small animals or pets comprising:
    an accessory module with logic control and reset segment;
    non-directional proximity detectors with accompanying interface circuits to verify, the presence of said small animals or pets, said detectors mounted on structural elements associated with said accessory module; and
    appropriate electrical connectors for said control system.

6. The control system according to claim 5 where said non-directional proximity detectors further comprises sensors composed of sufficient loops of wire to detect the appropriate small animals or pets.

7. The control system according to claim 5 wherein said accessory module further comprises a small animals feeder.

8. The control system according to claim 5 wherein said accessory module further comprises a small animals training system.

9. The control system according to claim 5 wherein said accessory module further comprises a pet flush toilet.

10. In a control system, for a pet flush toilet containing a pet sensing system and a solenoid-controlled flushing chamber energized by a logic control delay, reset, and relay segment connected appropriately together, wherein the improvement comprises:
using non-directional passive infrared detectors with accompanying interface circuits, wherein said detectors are mounted in conjunction with said flushing chamber for said pet sensing system.

11. In control system for a pet flush toilet containing a pet sensing system and a solenoid-controlled flushing chamber energized by logic control delay, reset, and relay segment connected appropriately together, wherein the improvement comprises:
using non-directional proximity detectors with accompanying interface circuits, wherein said detectors are imbedded in structural elements associated with said flushing chamber for said pet sensing system.

* * * * *